United States Patent [19]

Taylor et al.

[11] 3,818,009

[45] June 18, 1974

[54] ALPHA, ALPHA-DISUBSTITUTED-5-PYRIMIDINEMETHANES

[75] Inventors: Harold M. Taylor; James D. Davenport; Ronald E. Hackler, all of Indianapolis, Ind.

[73] Assignee: Eli Lilly and Company, Indianapolis, Ind.

[22] Filed: Mar. 13, 1972

[21] Appl. No.: 234,339

Related U.S. Application Data

[63] Continuation-in-part of Ser. No. 888,949, Dec. 29, 1969, abandoned, which is a continuation-in-part of Ser. No. 829,844, May 7, 1969, abandoned, which is a continuation-in-part of Ser. No. 685,315, Nov. 24, 1967, abandoned, which is a continuation-in-part of Ser. No. 634,074, April 27, 1967, abandoned.

[52] U.S. Cl................. 260/25 R, 71/90, 71/92, 260/240 D, 260/256.4 R, 260/565.5 R, 424/251

[51] Int. Cl......................................... C07d 51/36
[58] Field of Search..... 260/251 R, 240 D, 256.4 R, 260/256.5 R

[56] References Cited
UNITED STATES PATENTS
3,461,125  8/1969  Kollonitsch et al................ 260/251

*Primary Examiner*—Donald G. Daus
*Assistant Examiner*—Raymond V. Rush
*Attorney, Agent, or Firm*—Joseph A. Jones; Leroy Whitmaker; Everet F. Smith

[57] ABSTRACT

There is disclosed a class of $\alpha,\alpha$-disubstituted-5-pyrimidinemethanes and substituted methanes which are useful as fungicides, bactericides, herbicides, and plant growth regulators. Internodal elongation of plants is inhibited by treatment with a compound of this invention.

46 Claims, No Drawings

ALPHA, ALPHA-DISUBSTITUTED-5-PYRIMIDINEMETHANES

CROSS REFERENCE

This application is a continuation-in-part of our co-pending application Ser. No. 888,949, filed Dec. 29, 1969 now abandoned, which was a continuation-in-part of our then co-pending application Ser. No. 829,844, filed May 7, 1969, now abandoned, which was a continuation-in-part of our then co-pending application Ser. No. 685,315, filed Nov. 24, 1967, now abandoned, which was a continuation-in-part of our then copending application Ser. No. 643,074, filed Apr. 27, 1967, and now abandoned.

BACKGROUND OF THE INVENTION

Ornamental plants, food crops, and turf are annually severely damaged by many types of fungi. Because of this damage, much effort has been expended to find substances and methods for controlling such fungi.

In the prior art, Margot et al., U.S. Pat. No. 2,839,446 (June 17, 1958) teach novel pyrimidines which are said to possess fungicidal activity. The Margot compounds are distinguished by having at least one trichloromethane sulphenylmercapto group preferably attached at the 2-position of the pyrimidine ring.

In addition, Ballard et al. U.S. Pat. No. 2,658,895 (Nov. 10, 1953), teach 2-alkylphenyl-3,4,5,6-tetrahydropyrimidines which are said to have fungicidal and detergent properties and also to have use as asphalt additives.

Schellenberger et al., *Angew. Chem.* 76 (5), 226–7 (1964), teach the use of 2-methyl-5-hydroxymethyl-pyrimidine as an intermediate in the synthesis of a co-carboxylase inhibitor. This compound lacks R and R' substituents in the generic formula shown below, and, in our tests, has been found to be inactive.

Brederick et al., *Chem. Ber.*, 93, 230–35 (1960), teach the preparation of 5-isopropylpyrimidine and 5-isoheptylpyrimidine, respectively. No utility is disclosed therefor.

Lewin et al., *Arch. Biochem and Biophysics,* 101, 197–203 (1963), teach the use of 5-hydroxymethyl-pyrimidine as a substrate in studying the in vivo inhibition of thiamine synthesis.

SUMMARY

We have now discovered a class of novel 5-substituted pyrimidines which are effective fungicides, bactericides, and herbicides. In addition, internodal elongation of crop plants, ornamental plants, woody plants and turf is inhibited by treatment with a 5-substituted pyrimidine of this invention at a rate of 0.1 to 2 pounds per acre. Such treatment does not injure the plants.

DESCRIPTION OF THE PREFERRED EMBODIMENT

Our novel 5-substituted pyrimidines are compounds of the formula

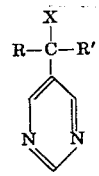

wherein
X is
  hydrogen,
  hydroxy,
  $C_1$–$C_4$ alkanoyloxy,
  $N(R'')_2$,
  $C_1$–$C_3$ alkyl,
  $C_1$–$C_3$ alkoxy,
  $C_1$–$C_3$ alkylthio,
  halo,
  cyano,
  anilino,
  hydroxylamino,
  imidazolylthio,
  furylthio, or
  thienylthio;
R is
  $C_2$–$C_{13}$ alkyl,
  $C_2$–$C_{12}$ alkenyl,

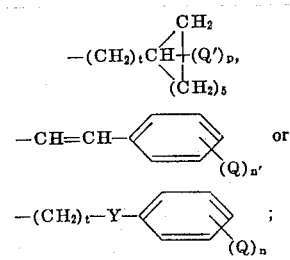

R' is
  $C_2$–$C_{13}$ alkyl,
  $C_2$–$C_{12}$ alkenyl,
  norbornen-2-yl,
  2-norbornyl,
  adamantyl,

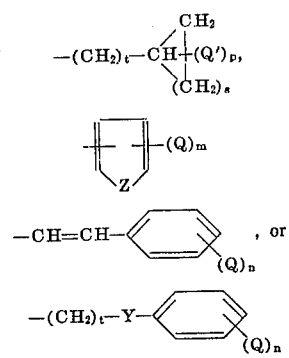

or when X is hydrogen or hydroxy, R and R' taken together with the carbon atom to which they are attached form a ring of the formula

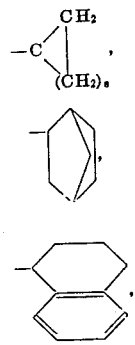

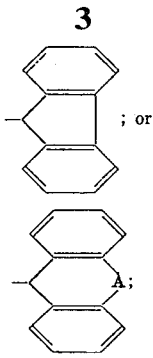

Q is $C_1-C_4$ alkyl, $C_1-C_4$ alkoxy, $C_1-C_4$ alkylthio, halo, hydroxy, trifluoromethyl, $C_1-C_4$ alkylsulfonyl, nitro, or di($C_1-C_4$ alkyl)amino, or two Q's attached to adjacent carbon atoms of a benzene ring form a methylenedioxy group;

Q' is $C_1-C_4$ alkyl or methoxy;

Y is oxygen, sulfur, or a carbon to carbon bond;

Z is oxygen or sulfur;

A is oxygen, sulfur, $CH_2$, $CH_2-CH_2$, or $CH=CH$;

R'' is hydrogen, $C_1-C_4$ alkyl, or $C_1-C_4$ alkanoyl;

n is 0 to 5;

m is 0 to 2;

p is 0 to 3;

s is 1 to 6; and t is 0 to 5, and the nonphytotoxic acid addition salts thereof.

$C_1-C_4$ alkanoyloxy means formyl, acetyl, propionyl, or butyryl.

The various alkyl groups are saturated straight or branched-chain aliphatic hydrocarbon radicals such as, for example, methyl, ethyl, n-propyl, isopropyl, n-butyl, sec.-butyl, tert.-butyl, n-amyl, isoamyl, sec.-amyl, tertiary amyl and other isomeric amyl, n-hexyl, isohexyl, sec.-hexyl, and other isomeric hexyl, n-heptyl, and other isomeric heptyls, n-octyl, isooctyl, and other isomeric octyls, n-primary nonyl (nonyl-1), nonyl-2, nonyl-3, nonyl-4, 2-methyloctyl-2, 4-ethylheptyl-4, 3-methyl-4-ethyl-hexyl-4, 3-methyl-3-ethyl-pentyl-3, 2-ethyl-hexyl-1, n-primary decyl (decyl-1), decyl-4, 2-ethyloctyl-3(tertiary) decyl), undecyl, n-dodecyl, n-tridecyl, and the like.

Illustrative alkoxy groups are methoxy, ethoxy, propoxy, isopropoxy, n-butoxy, and isobutoxy.

Illustrative alkylthio groups are methylthio, ethylthio, n-propylthio, isopropylthio, and n-butylthio.

Halo includes bromo, chloro, fluoro and iodo.

Each of R and R' may be cycloalkyl groups containing from three to eight carbon atoms, optionally substituted with from one to three $C_1-C_4$ alkyl or methoxy groups. These groups can be attached directly to the α-carbon atom of the pyrimidinemethane or may be attached through from one to five methylene groups.

Each of R and R' may also be phenyl, phenoxy, or phenylthio or substituted phenyl, phenoxy, or phenylthio attached directly to the α-carbon or through one to five methylene groups. They may also be styryl or substituted styryl. In addition, one of them may be furyl, substituted furyl, thienyl or substituted thienyl.

Suitable $C_2-C_6$ alkenyl groups include vinyl, allyl, propenyl, 1-butenyl, 2-butenyl, 1-pentenyl, 2-pentenyl, 3-pentenyl, 1-hexenyl, 2-hexenyl, or 3-hexenyl.

It should be noted that only when X is hydrogen is there a hydrogen attached to the α-carbon atom of our 5-pyrimidinemethanes. There are never two hydrogens attached to this α-carbon atoms. Thus, compounds wherein R and/or R' are hydrogen are outside the scope of our invention. We have found such compounds, for example the 2-methyl-5-hydroxymethylpyrimidine of Schellenberger et al., to lack the activity of the compounds of our invention.

When X in the generic formula is hydrogen, preferred compounds contain no more than one alkyl group attached to the α-carbon. The other substituent on the α-carbon atom may usefully be phenyl, substituted phenyl, or cycloalkyl. Other compounds of our invention which contain two alkyl substituents on the α-carbon have utility as plant growth regulators.

Suitable nonphytotoxic acid addition salts of the bases represented by the above formula can be prepared employing those acids of sufficient acidity to form acid addition salts with the weakly basic pyrimidine group or with an amine substituent attached thereto. These include, inter alia, hydrobromic, sulfuric, phosphoric, nitric, oxalic, methanesulfonic, hydrochloric, hydriodic, benzenesulfonic, p-toluenesulfonic, maleic, and the like.

Compounds regarded as coming within the scope of the above generic formula include, but are not limited to, the following.

5-(α-Methylthiodiphenylmethyl)pyrimidine 5-(α-Propionoxydiphenylmethyl)pyrimidine 5-(3-Fluorodiphenylmethyl)pyrimidine 5-[Bis(2,4-dichlorophenyl)methyl]pyrimidine α,α-Di(p-tolyl)-5-pyrimidineacetonitrile 5-(Phenyl-p-bromophenylmethyl)pyrimidine 5-[α-(2-Furylthio)diphenylmethyl]pyrimidine 5-[α-(2-Thienylthio)diphenylmethyl]pyrimidine 5-(α-Butyryloxydiphenylmethyl)pyrimidine α-Phenyl-α-(4-phenyl-n-butyl)-5-pyrimidinemethanol α-(3-Phenoxypropyl)-α-phenyl-5-pyrimidinemethanol, and the like.

The novel pyrimidines of the present invention have been found useful in controlling fungi which attack food crops, ornamental plants, and turf. The novel compounds have been found useful in combatting both airborne and soi;-borne fungi which affect plants. Most unexpectedly and surprisingly, the novel pyrimidine compounds of this invention, unlike the closely related pyridine compounds, are systemically active as fungicidal agents. That is, the pyrimidine compounds are absorbed by the plant and transported throughout the plant via the vascular system of the plant. Further, these novel pyrimidines have the ability to cause certain plants to produce, in a manner as yet unknown or understood, fungicidal substances of an unknown structure, which substances can be extracted from the plant tissues by methods known to the art and shown to possess fungicidal activity in standard fungicidal tests.

The systemic antifungal action of these pyrimidines have been demonstrated by the following remarkable experiment: Seeds of cucumbers, for example, are soaked for a short period of time, about 10 minutes, in an ethanol-light isoparaffin oil solution of 5-substituted pyrimidine. The seeds are removed, dried and planted and produce plants free from powdery mildew and protected therefrom.

The novel compounds of the present invention have been shown by suitable in vitro and in vivo tests to control such fungi as *Erysiphe polygoni*, the causative organism of bean powdery mildew; *Colletotrichum lagenarium*, the causative organism of cucumber anthracnose; *Uromyces phaseoli*, the causative organism of bean rust; *Piricularis oryzae*, the causative organism of rice blast; and *Rhizoctonia solani*, the causative organism of damping off in cotton.

In addition, certain fungi which affect ornamental plants including *Sphaerotheca pannosa* var. *rosae*, the causative organism of powdery mildew of rose, and *Erysiphe graminis*, the causative organism of powdery mildew of turf are controlled by the novel pyrimidines of this invention.

The novel compounds of this invention are also active against certain turn pathogens which yearly inflict great damage to turf. These turf pathogens include *Helminthosporium sativum*, the causative organism of leaf spot; *Rhizoctonia solani*, the causative organism of brown patch; *Sclerotinia homoeocarpe*, the causative organism of dollar spot; *Fusarium roseum*, the causative organism of root rot; and *Pythium* sp., the causative organism of pythium blight.

The novel compounds of this invention are utilized as fungicides by applying them to infected or susceptible plant surfaces, or to the soil. This is conveniently accomplished by spraying, dipping, dusting, or drenching. The compounds are also effective as fungicides when utilized in treating seeds prior to planting.

For any such uses the compounds are formulated into compositions desirably containing, in addition to the 5-substituted pyrimidine, one or more of a plurality of additaments including water, polyhydroxy compounds, petroleum distillates, and other dispersion media, surface-active dispersing agents, emulsifiers, and finely divided inert solids. The concentration of the 5-substituted pyrimidine compound in these compositions may vary depending on whether the composition is intended as an emulsifiable concentrate or a wettable powder designed to be subsequently diluted with additional inert carrier such as water to produce the ultimate treating composition or is intended for direct application as a dust to plants.

The novel compounds of the present invention are applied to plants in effective amounts, varying somewhat with the particular organism, with the severity of the infection, and with other factors such as the environment in which treatment is conducted. In general, it is found that an aqueous spray containing from about 2 to about 400 ppm. of active material is satisfactory when treatment is to be carried out in the greenhouse.

As is well understood in the art, a somewhat higher concentration of the active compound is desirable when treatment is to be carried out in the field. In that case, the preferred range is from about 15 to about 1000 ppm. of 5-substituted pyrimidine.

In the case of the turf pathogens, supra, control has been accomplished using an application rate of from about 0.05 to about 1.0 lb. per acre of the 5-substituted pyrimidine. Control of the other soil-borne fungi mentioned above has been accomplished using a broadcast application rate of about 5 to 40 lb. per acre of the 5-substituted pyrimidine.

Unexpected antibacterial activity has been shown by certain of the novel compounds. Thus, $\alpha,\alpha$-diphenyl-5-pyrimidinemethanol is active against *Agrobacterium tumefaciens*, the causative organism of crown gall. Other of the novel compounds, including 5-(2-chlorodiphenylmethyl)pyrimidine, and 5-bis(4-chlorophenyl)methylpyrimidine are active against *Xanthomonas phaseoli* var. *sojensis*, the causative organism of bacterial blight of soybean. $\alpha,\alpha$-Bis(cyclohexylmethyl)-5-pyrimidinemethanol is active against Rhizoctonia damping off.

Besides the above properties, the novel pyrimidines have shown unexpected herbicidal activity. In addition, the compounds possess interesting growth-inhibitor activity. Thus, 5-(2-chlorodiphenylmethyl)pyrimidine has been shown to inhibit tobacco sucker growth.

Another of the novel compounds, $\alpha$-(2-fluorophenyl)-$\alpha$-(3-fluorophenyl)-5-pyrimidinemethanol, possesses the ability to inhibit the opening of the buds of cut flowers.

Still other of the compounds, for example, $\alpha,\alpha$-diphenyl-5-pyrimidinemethanol and $\alpha$-(2-chlorophenyl)-$\alpha$-(4-chlorophenyl)-5-pyrimidinemethanol, exhibit anti-auxin properties.

Certain of the novel pyrimidines, i.e., $\alpha$-(2-fluorophenyl)-$\alpha$-(3-fluorophenyl-5-pyrimidinemethanol and $\alpha$-(2-chlorophenyl)-$\alpha$-(4-chlorophenyl)-5-pyrimidinemethanol, possess the completely unexpected and as yet unexplained ability to cause an increase in the number of flowers and fruit produced by tomato plants when said plants are treated with one of the compounds about 6 to 8 weeks prior to flower formation.

The novel 5-substituted pyrimidinemethanols (X is OH in the generic formula, supra) are readily prepared in good yields by a synthesis exemplified as follows. A suitable ketone, for example, benzoylcyclohexane, is dissolved in a solvent composed of equal volumes of tetrahydrofuran and ethyl ether. The solution is cooled to $-120°C.$, and while maintained at that temperature, a solution of 5-bromopyrimidine in equal volumes of tetrahydrofuran and ethyl ether is added thereto. While the mixture is maintained at about $-120°C.$, a hexane solution of n-butyl lithium is added. The reaction mixture is stirred over-night in the cold, the reaction product mixture washed successively with dilute aqueous ammonium chloride solution and water, and the organic layer separated and dried over a suitable drying agent. The dried organic layer is concentrated to dryness in vacuo and the solid residue extracted with ether to remove undesired by-products. The ether-insoluble material remaining is identified by elemental analysis as $\alpha$-cyclohexyl-$\alpha$-phenyl-5-pyrimidinemethanol.

An alternative method appears preferable in some instances and proceeds as follows. In a suitable reaction flask, dry ether is maintained in an atmosphere of dry nitrogen, cooled to about $-118°C.$, and a solution of butyl lithium in hexane added, followed by a solution of 5-bromopyrimidine in tetrahydrofuran. The reaction mixture is cooled to about $-120°C.$ and a solution of a suitable ketone, for example, 4-fluorobenzophenone, in tetrahydrofuran is added at such a rate as to maintain the temperature of the reaction mixture at about $-120°C.$ The reaction product mixture is stirred overnight and warmed gradually to room temperature. The mixture is neutralized with saturated aqueous ammonium chloride solution and extracted with ether. The combined ether extracts are dried, concentrated to dryness in vacuo and the residual material dissolved in benzene and chromatographed over a silica gel column, eluting with a mixture of ethyl acetate-benzene. The product obtained from the fraction eluted with 30:50 ethyl acetate-benzene was recrystallized from a solvent such as ether and identified as α-(4-fluorophenyl)-α-phenyl-5-pyrimidinemethanol.

When X is H in the generic formula, supra, some of the novel compounds can be prepared according to the procedure of Sperber et al., U.S. Pat. No. 2,727,895 (Dec. 20, 1955) whereby the 5-substituted pyrimidinemethanol (prepared as above) is heated in a mixture of glacial acetic acid and 47 percent aqueous hydriodic acid to reduce the hydroxyl group and yield the 5-substituted pyrimidinemethane.

In other compounds where X is H, the preparation is accomplished by the reaction of a suitably substituted malonic ester with urea or acetamidine, or the like. For example: A mixture of diethyl 4-methylbenzhydryl malonate and urea is allowed to react in an anhydrous alcohol such as methanol in the presence of sodium methylate to yield 2,4,6-trihydroxy-5-(4-methylbenzhydryl)pyrimidine. This trihydroxy compound is allowed to react with excess phosphorous oxychloride to yield 2,4,6-trichloro-5-(4-methylbenzhydryl)pyrimidine. The trichloropyrimidine is then hydrogenated in the presence of triethylamine and palladinized charcoal to yield 5-(4-methylbenzhydryl)pyrimidine.

Where X is cyano in the above generic formula, the novel compounds can be prepared in the following manner. A mixture of diphenylacetonitrile and 5-bromopyrimidine is allowed to react in the presence of potassium amide in a suitable solvent such as xylene to yield α,α-diphenyl-5-pyrimidineacetonitrile.

Those compounds where X is $C_1$–$C_3$ alkoxy are prepared by allowing an alkali-metal lower alkoxide such as sodium methoxide, potassium ethoxide, or sodium propoxide to react in alkanol solution with a 5-halo analogue of the desired product [e.g., 5-(α-chlorodiphenylmethyl)pyrimidine] to yield the desired product [e.g., 5-(α-$C_1$–$C_3$ alkoxydiphenylmethyl)-pyrimidine].

Those compounds where X is $C_1$–$C_3$ alkylthio are prepared in the following manner. A mixture of 5-(diphenylmethyl)pyrimidine and N-bromosuccinimide is dissolved in an inert, organic solvent, e.g., carbon tetrachloride, in the presence of benzoylperoxide and allowed to react to yield 5-(α-bromodiphenylmethyl)pyrimidine, which is separated and is in turn allowed to react with a suitable $C_1$–$C_3$ alkyl mercaptan, e.g., n-propyl mercaptan, in the presence of triethylamine, to yield the desired product, for example, 5-(α-n-propylthiodiphenylmethyl)pyrimidine.

In the case where X is $C_1$–$C_4$ alkanoyloxy, the compounds are prepared in the following manner: For example, a mixture of 5-(α-bromodiphenylmethyl)-pyrimidine, glacial acetic acid, and anhydrous sodium acetate is allowed to react to yield 5-(α-acetoxydiphenylmethyl)pyrimidine.

Where X is amino, the compounds are prepared by heating a mixture of the analogous halo-substituted pyrimidine, such as 5-(α-chlorodiphenylmethyl)pyrimidine, and excess liquid ammonia at an elevated temperature of about 100°C. in a sealed stainless steel reaction vessel for a time sufficient to complete the reaction. The product can be isolated as the free base 5-(α-aminodiphenylmethyl)pyrimidine, or in the form of a salt such as the hydrochloride, hydrobromide, or the like.

Correspondingly, 5-(α-hydroxylaminodiphenylmethyl)-pyrimidine and related compounds are readily prepared by allowing hydroxylamine to react with 5-(α-chlorodiphenylmethyl)pyrimidine or analogous 5-α-halo compounds.

Following the same general procedure, the 5-[α-(2-imidazolylthio)diphenylmethyl]pyrimidine is readily synthesized by allowing 2-mercaptoimidazole to react with 5-(α-chlorodiphenylmethyl)pyrimidine in the presence of a base such as sodium or potassium ethoxide in a suitable solvent such as absolute ethanol. The reaction product mixture is concentrated to dryness at reduced pressure and the solid residue slurried or extracted with a solvent such as hot benzene to dissolve the product, 5-[α-(2-imidazolylthio)diphenylmethyl)]pyrimidine, which then crystallizes from the benzene.

Where X is anilino, the compounds are readily prepared by heating a 5-halo analogue such as 5-(α-chlorodiphenylmethyl)pyrimidine with aniline in an inert solvent such as benzene on the steam bath for a time sufficient to complete the reaction. The aniline hydrochloride which precipitates is filtered off, the filtrate concentrated in vacuo to dryness, and the residue recrystallized from a suitable solvent such as ethyl ether to yield 5-(α,α-diphenyl-α-anilinomethyl)pyrimidine.

The following examples describe in detail the methods used in preparing the novel compounds of this invention. However, the invention is not to be construed as limited thereby either in spirit or in scope, since it will be apparent to those skilled in the art that many modifications both of materials and methods may be practiced within the purpose and intent of this disclosure.

Example 1

α-Cyclohexyl-α-phenyl-5-pyrimidinemethanol

To a solution of 0.1 mole of benzoylcyclohexane in 250 ml. of a mixture of equal volumes of tetrahydrofuran and ether and cooled to −120°C. was added a solution of 0.1 mole of 5-bromopyrimidine in the same mixed solvent. The mixture was stirred and maintained at about −120°C. in a cooling bath composed of liquid nitrogen and ethanol, and to the cooled solution were added 60 ml. of a 15 percent solution of n-butyl lithium in n-hexane, and the reaction mixture was stirred overnight.

The reaction product mixture was washed successively with 10 percent aqueous ammonium chloride solution and water and dried over anhydrous potassium carbonate. The dried organic solution was evaporated to dryness to yield a solid weighing about 14 g. The solid was extracted with ether and the undissolved solid washed twice with ether. The ether-insoluble material was identified as α-cyclohexyl-α-phenyl-5-pyrimidinemethanol having a melting point of about 156–157°C.

Following the general procedure of Example 1, with appropriate starting materials, the following compounds were prepared and isolated as free bases or acid addition salts thereof:

α,α-Bis(4-chlorophenyl)-5-pyrimidinemethanol. Melting point: Glass.

α-Phenyl-α-(4-chlorophenyl)-5-pyrimidinemethanol hydrochloride. Melting point: Glass.

α,α-Bis(cyclohexyl)-5-pyrimidinemethanol. Melting point: 142–144°C.

α,α-Bis(n-hexyl)-5-pyrimidinemethanol. Melting point: Viscous liquid.

α-Methyl-α-phenyl-5-pyrimidinemethanol. Melting point: 70°C.

α,α-Bis(3-fluorophenyl)-5-pyrimidinemethanol. Melting point: Glass.

α-(2-Chlorophenyl)-α-(3-chlorophenyl)-5-pyrimidinemethanol. Melting point: Glass.

α-(2-Chlorophenyl)-α-(4-fluorophenyl)-5-pyrimidinemethanol. Melting point: 66°C.

α-(2-Chlorophenyl)-α-cyclohexyl-5-pyrimidinemethanol. Melting point: 65°C.

α,α-Diphenyl-5-pyrimidinemethanol. Melting point: 167–170°C.

α-(2-Chlorophenyl)-α-phenyl-5-pyrimidinemethanol. Melting point: 154–156°C.

α-(n-Pentyl)-α-phenyl-5-pyrimidinemethanol. Melting point: Liquid.

α-(2-Fluorophenyl)-α-phenyl-5-pyrimidinemethanol. Melting point: 139–141°C.

α,α-Bis(3,4-dichlorophenyl)-5-pyrimidinemethanol hemietherate. Melting point: 88–89°C.

α-(Phenyl)-α-(2-thienyl)-5-pyrimidinemethanol. Melting point: 140–142°C.

α,α-Bis(isopropyl)-5-pyrimidinemethanol. Melting point: 115–118°C.

α-(4-Ethoxyphenyl)-α-isopropyl-5-pyrimidinemethanol. Melting point: 89°C.

α-Cyclopropyl-α-(4-methoxyphenyl)-5-pyrimidinemethanol. Melting point: 111°C.

α-(4-Chlorophenyl)-α-isopropyl-5-pyrimidinemethanol. Melting point: 129°C.

α-(t-Butyl)-α-(4-methoxyphenyl)-5-pyrimidinemethanol. Melting point: 117°C.

α-(p-Cumenyl)-α-isopropyl-5-pyrimidinemethanol. Melting point: 98°C.

α-(3,4-Dichlorophenyl)-α-isopropyl-5-pyrimidinemethanol. Melting point: 127°C.

α-Cyclohexyl-α-cyclopropyl-5-pyrimidinemethanol. Melting point: 113–114°C.

α-(3-Chlorophenyl)-α-isopropyl-5-pyrimidinemethanol. Melting point: 95°C.

α-Cyclopropyl-α-(p-cumenyl)-5-pyrimidinemethanol. Melting point: 104°C.

α-Cyclohexyl-α-isopropyl-5-pyrimidinemethanol. Melting point: Oil.

α,α-Bis(n-nonyl)-5-pyrimidinemethanol. Melting point: Oil.

α-(2,5-Dichlorophenyl)-α-cyclohexyl-5-pyrimidinemethanol. Melting point: 136°C.

α-(2-Chlorophenyl)-α-cyclohexyl-5-pyrimidinemethanol. Melting point: 65°C.

α-(2-Chlorophenyl)-α-(4-methoxyphenyl)-5-pyrimidinemethanol. Melting point: Glass.

α-Cyclohexyl-α-(2-methoxyphenyl)-5-pyrimidinemethanol. Melting point: 114–115°C.

α-Cyclohexyl-α-phenyl-5-pyrimidinemethanol. Melting point: 156–157°C.

α-Cyclohexyl-α-(2-fluorophenyl)-5-pyrimidinemethanol. Melting point: 140–142°C.

α-Cyclohexyl-α-pentafluorophenyl-5-pyrimidinemethanol. Melting point: 149–150°C.

α,α-Bis (2-chlorophenyl)-5-pyrimidinemethanol. Melting point: 132–133°C.

α-(α,α,α-Trifluoro-m-tolyl)-α-isopropyl-5-pyrimidinemethanol. Melting point: 97°C.

α-(α,α,α-Trifluoro-p-tolyl)-α-isopropyl-5-pyrimidinemethanol. Melting point: 113°C.

α-Isopropyl-α-(4-propoxyphenyl)-5-pyrimidinemethanol. Melting point: 80°C.

α-Cyclopropyl-α-(p-tolyl)-5-pyrimidinemethanol. Melting point: 128°C.

α-(4-Bromophenyl-α-cyclopropyl-5-pyrimidinemethanol. Melting point: 123°C.

α-(2-Fluorophenyl)-α-(4-fluorophenyl)-5-pyrimidinemethanol. Melting point: 130°C.

α-(t-Butyl)-α-(p-tolyl)-5-pyrimidinemethanol. Melting point: 155°C.

α-Cyclopropyl-α-(4-fluorophenyl)-5-pyrimidinemethanol. Melting point: 73–74°C.

α-Isopropyl-α-(4-methoxyphenyl)-5-pyrimidinemethanol. Melting point: 148°C.

α-(4-Chlorophenyl)-α-cyclopropyl-5-pyrimidinemethanol. Melting point: 112–113°C.

α-(4-Methoxyphenyl)-α-phenyl-5-pyrimidinemethanol. Melting point: 95–97°C.

α-(2,4-Difluorophenyl)-α-phenyl-5-pyrimidinemethanol. Melting point: 120–121°C.

α-(2,5-Dichlorophenyl)-α-phenyl-5-pyrimidinemethanol. Melting point: 134–136°C.

α-(4-Chlorophenyl)-α-isopropyl-5-pyrimidinemethanol. Melting point: 129°C.

α-Cyclobutyl-α-phenyl-5-pyrimidinemethanol. Melting point: 115–117°C.

α-(3,4-Dichlorophenyl)-α-phenyl-5-pyrimidinemethanol. Melting point: Glass.

α-(2,4-Dichlorophenyl)-α-phenyl-5-pyrimidinemethanol. Melting point: 96–97°C.

α-(4-Nitrophenyl)-α-phenyl-5-pyrimidinemethanol. Melting point: Glass.

α-(2-Fluorophenyl)-α-(3-fluorophenyl)-5-pyrimidinemethanol. Melting point: 104–108°C.

α,α-Bis(p-tolyl)-5-pyrimidinemethanol. Melting point: Glass.

α-(2,4-Dimethylphenyl)-α-phenyl-5-pyrimidinemethanol. Melting point: Glass.

α-Phenyl-α-(p-anisyl)-5-pyrimidinemethanol. Melting point: 95–97°C.

α,α-Bis(4-methylstyryl)-5-pyrimidinemethanol. Melting point: 159–160°C.

α-(4-Chlorophenyl)-α-(4-phenoxy-n-butyl)-5-pyrimidinemethanol. Viscous oil. Identified by N.M.R. spectrum and elemental analyses.

α-(5-Norbornen-2-yl)-α-phenyl-5-pyrimidinemethanol. Melting point: 137°C.

α,α-Bis[2-(4-methylcyclohexyl)ethyl]-5-pyrimidinemethanol. Viscous oil. Identified by N.M.R. spectrum and elemental analyses.

α-Phenyl-α-(3-phenyl-n-propyl)-5-pyrimidinemethanol. Viscous oil. Identified by N.M.R. and elemental analyses.

α-(4-Phenoxybutyl)-α-(2-norbornyl)-5-pyrimidinemethanol. Melting point: 132°C.

α-(4-Chlorophenyl)-α-(2-norbornyl)-5-pyrimidinemethanol. Melting point: 193°C.

α-(Pentenyl)-α-phenyl-5-pyrimidinemethanol. Viscous oil. Identified by N.M.R. spectrum.

α-(3-Pentenyl)-α-phenyl-5-pyrimidinemethanol. Glass. Identified by N.M.R. spectrum.

α-Phenyl-α-(4-trifluoromethylphenyl)-5-pyrimidinemethanol. Melting point: 125–127°C.

α-cyclobutyl-α-(4-methoxyphenyl)-5-pyrimidinemethanol. Melting point: 148°C.

Example 2

5-Bis(4-chlorophenyl)-methylpyrimidine

A mixture of 6 g. of α,α-bis(4-chlorophenyl)-5-pyrimidinemethanol, 200 ml. of glacial acetic acid, and 10 ml. of 47 percent hydriodic acid was refluxed for 40 minutes, poured into water, and the aqueous mixture extracted several times with ether. The combined ether layers were washed successively with water, 5 percent aqueous sodium bicarbonate solution, and water, dried over anhydrous magnesium sulfate, and evaporated in vacuo to dryness. The residue was extracted with petroleum ether and the extracts concentrated. The product was obtained as a thick reddish oil identified by infrared and nuclear magnetic resonant (NMR) spectra as 5-bis(4-chlorophenyl)methylpyrimidine.

Following the same general procedure as in Example 2, with appropriate starting materials, the following compounds were prepared:

5-(2-Fluorodiphenylmethyl)pyrimidine. Melting point: Viscous oil.

5-Diphenylmethylpyrimidine. Melting point: 83°C.

5-(α-Isopropyl-4-methoxybenzyl)pyrimidine. Melting point: 67–69°C.

5-[Bis(3,4-dichlorophenyl)methyl]pyrimidine. Melting point: Viscous oil.

Example 3

α,α-Diphenyl-5-pyrimidineacetonitrile

To 0.1 mole of potassium amide in liquid ammonia was added a solution of 0.1 mole of diphenylacetonitrile in 300 ml. of xylene, and the mixture was heated to refluxing for about 30 minutes to remove excess ammonia. To the xylene solution was added a solution of 0.1 mole of 5-bromopyrimidine in 100 ml. of xylene and the mixture stirred for about 20 minutes. To the mixture were then added 20 ml. of dimethylformamide and the mixture was refluxed for about 1 hour. The reaction product mixture was cooled in an ice bath and extracted with ether. The ether solution was evaporated to dryness, the residue dissolved in benzene and chromatographed on an alumina column, elution being carried out with ethyl acetate. The eluate was concentrated to yield α,α-diphenyl-5-pyrimidineacetonitrile as a solid having a melting point of about 98–100°C., identified by NMR spectrum and elemental analysis.

Example 4

2,4,6-Trichloro-5-(4-methylbenzhydryl)pyrimidine

To a solution of 22 g. (0.95 g.-atom) of sodium in 500 ml. absolute ethanol was added a solution of 33 g. (0.55 mole) of urea and 95 g. (0.28 mole) of diethyl 4-methylbenzhydryl malonate in 500 ml. of absolute ethanol, and the mixture was refluxed for about two hours. The reaction product mixture was cooled and diluted with about 1000 ml. of water and 500 ml. of ether. The layers were separated. The aqueous layer was washed with about 200 ml. of ether. The ether washings were combined with the original organic layer and washed with 200 ml. water. The washed aqueous layer and the water washings were combined and acidified with concentrated aqueous hydrochloric acid. An oily layer separated which solidified under vacuum. The crude solid was dissolved in dilute aqueous sodium hydroxide and the basic solution acidified with acetic acid. The solid which separated was recrystallized from acetic acid to yield a crystalline solid having a melting point of about 115°C. and identified by NMR spectrum as 5-(4-methylbenzyhydryl)barbituric acid. Weight: 45 g.

A mixture of 39 g. (0.13 mole) of 5-(4-methylbenzhydryl)barbituric acid (prepared above), 116 g. (0.76 mole) of phosphorus oxychloride, and 56 g. (0.38 mole) of N,N-diethylaniline was heated at reflux temperature for about 6 hours. The reaction product mixture was cooled, diluted with a mixture of crushed ice and water, and allowed to stand for about an hour. The mixture was extracted five times with 300 ml. of ether, the combined extracts were dried and the solvent was evaporated to dryness on the steam bath. The residue remaining was extracted with hot petroleum ether. (b.p. = 60–70°C.). The petroleum ether solution was cooled, and a crystalline product separated which had a melting point of about 112–113°C. and weighed about 30 g. It was identified by NMR spectrum and elemental analysis as 2,4,6-trichloro-5-(4-methylbenzhydryl)pyrimidine.

Following the general procedure of Example 4, with appropriate starting materials, other compounds were prepared and are listed as follows:

2,4,6-Trichloro-5-(benzhydryl)pyrimidine. Melting point: 105–106°C.

2,4,6-Trichloro-5-(4-methoxybenzhydryl)pyrimidine. Melting point: 129–131°C.

2,4,6-Trichloro-5-(2-chlorobenzhydryl)pyrimidine. Melting point: 162–163°C.

2,4,6-Trichloro-5-(1-phenyl-n-heptyl)pyrimidine. Melting point: Oil.

2,4,6-Trichloro-5-(1-phenyl-n-tridecyl)pyrimidine. Melting point: Oil.

2,4,6-Trichloro-5-(1-phenyl-n-butyl)pyrimidine. Melting point: 72°C.

Example 5

5-(4-Methylbenzhydryl)pyrimidine

A mixture of 15 g. (0.041 mole) of 2,4,6-trichloro-5-(4-methylbenzhydryl)pyrimidine, 12.5 g. (0.124 mole) triethylamine, 100 ml. dry dioxane, and 1 g. of 5 percent palladinized charcoal was hydrogenated on a Paar shaker at an initial pressure of 15 p.s.i. for about 5 hours, during which time the theoretical amount of hydrogen was absorbed. When the hydrogenation was complete, the reaction product mixture was concentrated in vacuo to dryness. The residue was dissoved in benzene and chromatographed on an alumina column, eluting with ethyl acetate. A solid was obtained which was recrystallized from petroleum ether to yield crystalline material having a melting point of about 71–72°C., and identified by NMR spectrum and elemental analysis as 5-(4-methylbenzhydryl)pyrimidine. Weight: 8 g.

Following the general procedure of Example 5 with appropriate starting materials, other compounds were prepared and are listed as follows:

5-(benzhydryl)pyrimidine. Melting point: 83°C.

5-(4-Methoxybenzhydryl)pyrimidine. Melting point: Oil.

5-(2-Chlorobenzhydryl)pyrimidine. Melting point: 107–108°C.

5-(1-Phenyl-n-heptyl)pyrimidine. Melting point: Oil.

5-(1-Phenyl-n-butyl)pyrimidine. Melting point: Oil.

5-(1-Phenyl-n-tridecyl)pyrimidine. Melting point: Oil.

Example 6

5-(α-Chlorodiphenylmethyl)pyrimidine

To a refluxing solution of 40 g. of α,α-diphenyl-5-pyrimidinemethanol in 200 ml. of xylene was added anhydrous hydrogen chloride gas via a bubbler tube, and the by-product water was collected in a Dean-Stark trap. The reaction product mixture was concentrated in vacuo to dryness. The dry residue was washed with ethyl ether to remove starting material, and the ethyl ether-insoluble residue was dissolved in hot petroleum ether. The petroleum ether was evaporated to dryness and the residue recrystallized from ether to yeild solid product weighing 6 g. and having a melting point of about 92–94°C. The product was identified as 5-(α-chlorodiphenylmethyl)pyrimidine by elemental analysis and NMR spectrum.

Example 7

5-(α,α-Diphenyl-α-anilinomethyl)pyrimidine

A mixture of 5 g. of 5-(α-chlorodiphenylmethyl)pyrimidine, 10 ml. of aniline, and 40 ml. of benzene was warmed for about an hour on the steam bath. The reaction product mixture was cooled and filtered to remove aniline hydrochloride, and the filtrate concentrated to dryness. The solid residue was recrystallized from ethyl ether to yield a yellow crystalline product weighing 2 g. and having a melting point of about 140–144°C. The product was identified as 5-(α,α-diphenyl-α-anilinomethyl)pyrimidine by NMR spectrum.

Example 8

5-(α,α-Diphenyl-α-hydroxylamino)pyrimidine

A mixture of 5 g. of 5-(α-chlorodiphenylmethyl)pyrimidine and excess hydroxylamine in ethanolic sodium ethoxide was refluxed for about 1 hour. The reaction product mixture was evaporated to dryness and the residue extracted with benzene. The benzene solution was filtered, concentrated to dryness, and the residue extracted with ether. The ether extract was concentrated to dryness, yielding a crude product having a melting point of about 110–125°C., identified by NMR and infrared spectra as 5-(α,α-diphenyl-α-hydroxylamino)pyrimidine.

EXAMPLE 9

5-(α-Ethoxydiphenylmethyl)pyrimidine

A mixture of 10 g. of 5-(α-chlorodiphenylmethyl)pyrimidine and a saturated solution of liquid ammonia in absolute alcohol was prepared and an exothermic reaction took place. When the exothermic reaction had subsided, the reaction product mixture was filtered and the filtrate evaporated to dryness. The solid residue was extracted with chloroform and the chloroform solution allowed to stand overnight at ambient room temperature. The crude crystals which separated were dissolved in ethyl acetate and chromatographed over alumina using a mixture of hexane and ethyl acetate as eluting solvent. A solid having a melting point of about 95–97°C. was obtained from the eluate and identified by NMR spectrum and elemental analysis as 5-(α-ethoxydiphenylmethyl)pyrimidine.

EXAMPLE 10

6-(α-Aminodiphenylmethyl)pyrimidine

A mixture of 12 g. of 5-(α-chlorodiphenylmethyl)pyrimidine and an excess of liquid ammonia was heated at a temperature of about 100°C. for about 2 hours in a closed stainless steel high-pressure reaction vessel. The reaction product was removed from the reaction vessel, the excess ammonia allowed to evaporate, and the residue extracted with benzene. The benzene solution was concentrated to yield a crystalline product having a melting point of about 135–137°C. The product was identified as 5-(α-aminodiphenylmethyl)pyrimidine by NMR spectrum and elemental analysis.

EXAMPLE 11

5-[α-(2-Imidazolylthio)-diphenylmethyl]pyrimidine

The potassium salt of 2-mercaptoimidazole was prepared by adding 10 g. of 2-mercaptoimidazole to an ethanol solution of potassium ethoxide prepared from 1 g. of potassium and 200 ml. of absolute ethanol. To the above mixture were added 5 g. of 5-(α-chlorodiphenylmethyl)pyrimidine and the reaction mixture heated to refluxing for about 2 hours. The reaction product mixture was concentrated in vacuo to dryness and the residue extracted with hot benzene. The benzene extract was cooled, and a solid product crystallized therefrom, weighing 3 g. and having a melting point of about 165–167°C. It was identified as 5-[α-(2-imidazolylthio)diphenylmethyl]-pyrimidine by elemental analysis and NMR spectrum.

EXAMPLE 12

5-(α-Phenylphenethyl)pyrimidine

To sodamide in liquid ammonia prepared by the addition of 1.2 g. (0.05 g.-atom) of sodium to 500 ml. of liquid ammonia, were added 8.3 g. (0.05 mole) of 5-benzylpyrimidine, and the resulting red-brown mixture was stirred for about 10 to 15 minutes. A solution of 6.3 g. (0.05 mole) of benzyl chloride in 15 ml. anhydrous ether was added and the reaction mixture stirred about one hour. To the reaction product mixture were added 200 ml. of ether and the mixture was evaporated to near dryness on the steam bath. The residue was slurried again with 200 ml. of ether and evaporated to dryness. The dry residue was dissolved in a mixture of about 500 ml. of ether and 200 ml. of water and the ether layer separated and dried over anhydrous magnesium sulfate. The drying agent was filtered off, and from the ether solution a solid precipitated. The solid, on standing, became an oil, which was dissolved in benzene and chromatographed on an alumina column, elution being carried out with a mixture of ethyl acetate and benzene. From the eluate a solid product was obtained which, upon recrystallization from petroleum ether, had a melting point of about 80–82°C. The crystalline product weighed about 5 g. and was identified as 5-(α-phenylphenethyl)pyrimidine by elemental analysis and NMR spectrum.

EXAMPLE 13

5-(α-Acetamidodiphenyl-methyl)pyrimidine

A mixture of 4.5 g. of 5-(α-aminodiphenylmethyl)pyrimidine and 50 ml. of acetic anhydride was heated until a homogeneous solution was obtained. The reaction product mixture was allowed to stand at ambient room temperature overnight and then was concentrated in vacuo to remove the solvent, leaving a dry residue. The residue was recrystallized from hot benzene to yield about 2.5 g. of crystalline product having a melting point of about 187–189°C. The product was identified as 5-(α-acetaminodiphenylmethyl)pyrimidine by elemental analyses and NMR spectrum.

EXAMPLE 14

α-(4-Fluorophenyl)-α-phenyl-5-pyrimidinemethanol

To 300 ml. of anhydrous ether maintained in an atmosphere of dry nitrogen gas in a suitably equipped 3-neck round-bottom reaction flask cooled to −118°C. by an alcohol-liquid nitrogen cooling bath, were added 170 ml. (0.3 mole) of a 15 percent solution of butyl lithium in hexane. Cooling and stirring in the dry nitrogen atmosphere were continued while a solution of 0.3 mole of 5-bromopyrimidine in 150 ml. of dry tetrahydrofuran was added and the whole stirred for about 2 hours. The temperature of the reaction mixture was lowered to −125°C. and a solution of 0.3 mole of 4-fluorobenzophenone in 150 ml. of dry tetrahydrofuran was added slowly while maintaining the temperature of the mixture at about −120°C. The reaction product mixture was stirred overnight and warmed to ambient room temperature. The reaction product mixture was neutralized by the addition of a saturated aqueous solution of ammonium chloride. The neutralized mixture was extracted with ether and the combined ether extracts dried over anhydrous potassium carbonate, filtered, and concentrated to dryness in vacuo and the residue dissolved in benzene. The benzene solution was chromatographed over 1500 g. of silica gel, elution being accomplished with an ethyl acetate-benzene mixture, using a gradient elution technique. The fraction obtained using a solvent containing 30:50 ethyl acetate-benzene was concentrated to dryness at reduced pressure, yielding 52 g. of product having a melting point of about 112–114°C. after recrystallization from ether. The product was identified by elemental analyses and NMR spectrum as α-(4-fluorophenyl)-α-phenyl-5-pyrimidinemethanol.

EXAMPLE 15

5-(α-n-Propylthiodiphenylmethyl)pyrimidine

The halogen-substituted pyrimidine, 5-(α-bromodiphenylmethyl)pyrimidine used in this synthesis was prepared as follows.

To a solution of 25 g. (0.1 mole) of 5-(diphenylmethyl)pyrimidine in 250 ml. of carbon tetrachloride was added 18.7 g. (1.05 equivalents) of N-bromosuccinimide and 0.05 g. of benzoyl peroxide. The reaction mixture was refluxed for about 1.5 hours, cooled and concentrated to dryness in vacuo to remove the solvent. The solid residue which remained was extracted several times with methylene dichloride to obtain the 5-(α-bromodiphenylmethyl)pyrimidine, and the combined extracts divided into two equal portions.

The methylene dichloride solvent was removed in vacuo from one portion and there was added to the residue a solution of 7.6 g. (0.1 mole) of n-propylmercaptan in 150 ml. of triethylamine. A precipitate formed almost immediately after the mixing. The reaction mixture was stirred overnight at ambient room temperature, and then refluxed for about 1 hour and the solvent removed at reduced pressure. The residue was treated with a mixture of ether and water, the ether layer separated and dried, after which the ether solvent was evaporated to leave a solid residue. The residue was extracted several times with hot petroleum ether (b.p. 60–71°C.). The petroleum ether was evaporated in vacuo to yield a viscous oil, identified by nuclear magnetic resonance spectrum as 5-(α-n-propylthiodiphenylmethyl)pyrimidine.

EXAMPLE 16

5-(α-Acetoxydiphenylmethyl)pyrimidine

The second methylene dichloride solution of 5-(α-bromodiphenylmethyl)pyrimidine was concentrated in vacuo to remove the solvent, and to the residue was added 100 ml. of glacial acetic acid and 8.2 g. (0.1 mole) of anhydrous sodium acetate. The reaction mixture was stirred overnight at ambient room temperature and then heated to refluxing. After about 2 hours, the solvent was removed in vacuo and the solid residue extracted three times with 100 ml. of hot benzene, filtering each time. The benzene extracts were combined and evaporated to dryness in vacuo. The residue was extracted with several portions of hot petroleum ether (b.p. 60–71°C.), the extracts combined, concentrated, and cooled. The solid material which crystallized out was identified by its nuclear magnetic resonance spectrum as 5-(α-acetoxydiphenylmethyl)-pyrimidine.

We have found that our novel 5-substituted pyrimidines are especially effective in inhibiting internodal growth of plants when applied at rates within the range of about 0.1 to about 2 pounds per acre. At these rates there is no adverse effect or injury to the plant. Larger amounts can be used, but are not economically attractive. The exact amount of compound to be used will vary somewhat depending upon the activity of the particular compound being used and the sensitivity of the particular plant being treated.

The types of plants that we have found to be affected in this manner by our compounds include crop plants, ornamental plants, woody plants and turf. Specific examples of these types of plants include cucumber, soybean, chrysanthemum, wheat, oats, barley, corn, rye, flax, privet, rice, cotton, tobacco, tomato and bluegrass. Although it has not been conclusively proved, it appears that the production of blossoms and fruit is increased with the decrease in foliar growth.

While we do not wish to be bound to any theory as to the mode of activity of our compounds, we believe that they owe their activity to their unique properties as gibberellic acid antagonists. This would explain the broad spectrum activity of the compounds. In ex-plant assays designed to demonstrate gibberellic acid activity, our compounds have performed as antagonists at levels as low as about 2.5 p.p.m. Further, when both the inhibiting compound and gibberellic acid are applied to plants at the same time growth inhibiting effects are partially neutralized. The growth of inhibited plants is stimulated when gibberellic acid is applied about two weeks after application of the inhibitor.

It has been our observation that root applications of our compounds have resulted in the greatest activity. However, other methods of application, such as foliar spray or seed treatment can be used with some degree of success. For application our compounds are formulated into drenches, spray concentrates, wettable powders, dusts, etc., in accordance with procedures known in the art. The preparation of such formulations is described hereinabove in connection with the use of our compounds as fungicides.

The rate of application of our compounds will vary with the particular compound being employed and the plant being treated. In general, the compound should be applied at a rate within the range of about 0.1 to about 2 pounds per acre, and preferably within the range of about 0.25 to about 1.5 pounds per acre. As discussed above, the mode of application also affects the degree of activity and could result in differences in the effective amount. Not surprisingly, we have found that mature plants are not as susceptible as immature ones.

The following examples will illustrate the growth inhibiting activity of our compounds.

EXAMPLE 17

α-cyclopropyl-α-(4-methoxyphenyl)-5-pyrimidinemethanol was applied to Amsoy soybeans, Yellow Delaware chrysanthemums, and Kentucky bluegrass by both foliar spray and soil drench at three rates for each mode of application. Duplicate sets of plants were treated at each rate of each mode and duplicate sets of untreated controls were also employed. The growth of the treated plants was compared to the controls and the degree of inhibition noted by a numbering system having the following meaning.

+3 = Distinct promotion
+2 = Moderate promotion
+1 = Slight promotion
0 = No effect
−1 = Slight inhibition
−2 = Moderate inhibition
−3 = Severe inhibition The average results from the two sets of treated plants are reported in the following table.

| Rate lb./A. | Spray | | | Drench | | |
|---|---|---|---|---|---|---|
| | Soybean | Mum | Bluegrass | Soybean | Mum | Bluegrass |
| 0.4 | −2 | −2.5 | −0.5 | | −0.5 | −3 |
| 2.0 | −2.5 | −3 | −2.5 | −2 | −3 | −2.5 |
| 10.0 | −3 | −3 | −3 | −3 | −3 | −3 |

EXAMPLE 18

A procedure similar to that described in Example 19 was used in testing the activity of a number of compounds against Harosoy soybeans, Yellow Delaware chrysanthemums and Kentucky bluegrass. The results are reported in the following table. Not every compound was tested against each plant at each rate of application.

| Compund | Rate, lb./A | Spray | | | Drench | | |
|---|---|---|---|---|---|---|---|
| | | Soybean | Mum | Bluegrass | Soybean | Mum | Blue. grass |
| α-cyclobutyl- α-phenyl-5- pyrimidine- methanol | 0.25 | −0.3 | −0.7 | −1.3 | −2 | −1 | −0.7 |
| | 0.5 | −1 | −2 | −1 | −3 | −1.7 | −0.7 |
| | 0.75 | −2 | −2 | −1 | −2.7 | −2 | −1 |
| | 2.0 | −3 | −2.7 | −1.3 | −3 | −3 | −1.7 |
| | 3.0 | −3 | −2.7 | −2 | −3 | −3 | −1.7 |
| | 5.0 | −3 | −2.7 | −2.7 | −3 | −3 | −3 |
| α-Cyclopropyl- α-(4-methoxy- phenyl-5- pyrimidine methanol | 0.25 | −1 | −2.7 | −0.7 | −2.7 | −2.3 | −0.7 |
| | 0.5 | −1 | −2.7 | −0.7 | −2.7 | −3 | −1 |
| | 0.75 | −1.7 | −3 | −1 | −3 | −3 | −1.3 |
| | 2.0 | '2.7 | −2.7 | −1.7 | −2.7 | −2.7 | −1 |
| | 3.0 | −2.7 | −3 | −2.3 | −3 | −3 | '2.3 |
| | 5.0 | −3 | −3 | −3 | −3 | −2.7 | −3 |
| α-Cyclopentyl- α-phenyl-5- pyrimidine- methanol | 0.25 | −1.5 | 0 | −0.5 | 0 | −1.5 | −1 |
| | 0.5 | −2.5 | −1.5 | −1 | 0 | −1 | −0.5 |
| | 0.75 | −3 | −1.5 | −1.5 | 0 | −1 | −0.5 |
| α-(2-Chloro-4- methoxy- phenyl)-α- phenyl-5- pyrimidine- methanol | 0.4 | 0 | 0 | 0 | 0 | 0 | 0 |
| | 2 | 0 | 0 | 0 | 0 | 0 | −1 |
| | 10 | 0 | 0 | −1 | 0 | 0 | −3 |
| α,α-Bis(n-octyl)- 5-pyrimidine- methanol | 0.4 | −3 | −1 | 0 | −1 | 0 | 0 |
| | 2 | 0 | 0 | 0 | 0 | 0 | 0 |
| | 10 | −2 | 0 | 0 | −2 | 0 | 0 |
| α,α-Bis(4-chloro- phenyl)-5- pyrimidine- methanol | 0.4 | 0 | — | −1 | −1 | — | −2 |
| | 2 | 0 | — | 0 | −1 | — | −1 |
| | 10 | 0 | — | −1 | −1 | — | −2 |
| α-(3-Cyclo- hexenyl)-α- (3,4-methylene- dioxphenyl)- 5-pyrimidine- methanol | 0.4 | 0 | −1 | 0 | 0 | 0 | −1 |
| | 2 | 0 | −1 | 0 | 0 | 0 | −2 |
| | 10 | 0 | −3 | −3 | −1 | 1 | 3 |
| α-Cyclohexyl- α-(m-tolyl)- 5-pyrimidine- methanol | 0.4 | 0 | 0 | −1 | 0 | 0 | 0 |
| | 2 | 0 | 0 | −2 | 0 | 0 | −2 |
| α-Cyclopropyl- α-(2,4-xylyl)- 5-pyrimidine- methanol | 0.4 | 0 | 0 | 0 | 0 | 0 | 0 |
| | 2 | 0 | −2 | 0 | −3 | −2 | ) |
| | 10 | 0 | −2 | — | −3 | −3 | −2 |
| α-Cyclohexyl- α-cyclohexyl- methyl-5- pyrimidine- methanol | 0.4 | 0 | 0 | 0 | 0 | 0 | −1 |
| | 2 | 0 | 0 | 0 | 0 | 0 | −2 |
| | 10 | 0 | 0 | −1 | −1 | 0 | −3 |

| Compound | Rate, lb./A | Spray Soybean | Mum | Bluegrass | Drench Soybean | Mum | Bluegrass |
|---|---|---|---|---|---|---|---|
| 5-(α-phenyl-phenethyl)-pyrimidine | 0.4 | 0 | — | 0 | 0 | — | 0 |
|  | 2 | −2 | — | 0 | 0 | — | −1 |
|  | 10 | −2 | — | 2 | 0 | — | −2 |
| α-Phenyl-α-(2-thienyl)-5-pyrimidine-methanol | 0.4 | −1 | — | 0 | +1 | — | 0 |
|  | 2 | 0 | — | 0 | 0 | — | −1 |
|  | 10 | −2 | — | −2 | −2 | — | −3 |
| α-(2-Fluorophenyl)-α-phenyl-5-pyrimidine-methanol | 0.4 | −1 | — | 0 | −2 | — | −1 |
|  | 2 | +1 | — | −1 | −1 | — | −2 |
|  | 10 | 0 | — | −3 | −2 | — | −3 |
| α-Isobutyl-α-isopropyl-5-2-pyrimidine-Omethanol | 0.4 | 0 | −1 | 0 | −2 | 0 | 0 |
|  | −3 | −1 | 0 | — | −2 | 0 | — |
|  | 10 | −3 | −1 | 0 | — | −2 | −3 |
| q-(5-Pyrimidin-yl)-xanthen-9-ol | 0.4 | 0 | — | 0 | 0 | — | — |
|  | 2 | −2 | — | −2 | 0 | — | −3 |
|  | 10 | −3 | — | −3 | −1 | — | −3 |
| 5-Benzhydryl-pyrimidine | 0.4 | 0 | — | −1 | 0 | — | 0 |
|  | 2 | 0 | — | 0 | 0 | — | 0 |
|  | 10 | 0 | — | −3 | 0 | — | −2 |
| 5-(α-Ethoxydi-phenylmethyl)-pyrimidine | 0.4 | +1 | — | −1 | 0 | — | −1 |
|  | 2 | +2 | — | −2 | 0 | — | −3 |
|  | 10 | −3 | — | −3 | 0 | — | −3 |
| 9-(5-Pyrimidin-yl)fluoren-9-ol | 0.4 | −1 | — | −1 | 0 | — | −1 |
|  | 2 | 0 | — | −2 | 0 | — | −3 |
|  | 10 | −1 | — | −3 | −2 | — | −3 |
| α-(3-Fluorophenyl)-α-pyrimidine-methanol | 0.4 | −2 | 0 | 0 | 0 | 0 | 0 |
|  | 2 | 0 | 0 | 0 | −2 | 0 | −1 |
|  | 10 | −2 | −1 | 0 | −2 | −2 | −2 |

EXAMPLE 19

A number of plants were treated with liquid formulations containing various concentrations of α-cyclopropyl-α-(4-methoxyphenyl)-5-pyrimidinemethanol applied at the rates indicated. Application either by foliar spray or soil drench was used. The results are given in terms of percent inhibition as compared to untreated controls.

| Conc., Plant | Rate, p.p.m. | lb./A. | % Inhibition |
|---|---|---|---|
| Harosoy soybeans (foliar) | 62.5 | 0.12 | 2.7 |
|  | 125 | 0.23 | 15 |
|  | 250 | 0.46 | 31 |
|  | 500 | 0.92 | 52 |
|  | 1000 | 1.85 | 68 |
| Cucumber (foliar) | 62.5 | 0.12 | 53.9 |
|  | 125 | 0.23 | 53.9 |
|  | 250 | 0.46 | 63.3 |
|  | 500 | 0.92 | 62.8 |
|  | 1000 | 1.85 | 67.4 |
| Privet (soil) | 62.5 | 0.15 | 32.0 |
|  | 125 | 0.30 | 11.7 |
|  | 250 | 0.61 | 57.0 |
|  | 500 | 1.22 | 63.3 |
|  | 1000 | 2.44 | 82.8 |

-Continued

| Conc., Plant | Rate, p.p.m. | lb./A. | % Inhibition |
|---|---|---|---|
| Chrysanthemum (foliar) | 62.5 | 0.06 | 8.4 |
|  | 62.5 | 0.12 | 13.1 |
|  | 6.25 | 0.25 | 30.8 |
|  | 125 | 0.12 | 27.1 |
|  | 125 | 0.25 | 30.8 |
|  | 125 | 0.5 | 49.5 |
|  | 250 | 0.25 | 38.3 |
|  | 250 | 0.5 | 51.4 |
|  | 250 | 1.0 | 60.7 |
|  | 500 | 0.5 |  |
|  | 500 | 1.0 | 63.1 |
|  | 500 | 2.0 | 72.0 |
| Wheat (foliar) | 62.5 | 0.12 | 0 |
|  | 125 | 0.23 | 0 |
|  | 250 | 0.46 | 9.4 |
|  | 500 | 0.92 | 28.1 |
|  | 1000 | 1.85 | 40.6 |
| Barley (foliar) | 62.5 | 0.12 | 0 |
|  | 125 | 0.23 | 0 |
|  | 250 | 0.46 | 0 |
|  | 500 | 0.92 | 0 |
|  | 1000 | 1.85 | 31.6 |
| Rye (foliar) | 62.5 | 0.12 | 0 |
|  | 125 | 0.23 | 12.1 |
|  | 250 | 0.46 | 15.1 |
|  | 500 | 0.92 | 18.1 |
|  | 1000 | 1.85 | 42.4 |

Our compounds have been proved to be efficacious in the control of fungus diseases. The tests which are reported in the following example were conducted with plants artificially infected with several fungus diseases. The tests were conducted as follows.

In these tests, solutions of the test compounds were prepared by dissolving 40 mg. of the test compound in 1 ml. of cyclohexanone containing 55 mg. of a blend of surfactants (Toximul R and Toximul S, Stepan Chemical Company, Northfield, Ill.) and diluting to a volume of 100 ml. with water. This solution then contained 400 ppm. of the test compound and could be further diluted with water to obtain other concentrations. The test solution was then sprayed on young plants, allowed to dry, and the treated plant then exposed to the disease organism, either by placing them in close proximity to diseased plants or by spraying with a suspension of spores of the organism. A concentration of 400 ppm. of the test compound was employed in all tests reported in Example 20, except for the bean rust tests where the concentration was 40 ppm.

The fungus organisms, and the host plants, are coded as follows.

PM — powdery mildew of bean (*Erysiphe cichoracearum*)

LB — late blight of tomato (*Phytophthora infestans*)

A — anthracnose of cucumber (*Colletotrichum lagenarium*)

BR — rust of bean (*Curomyces phaseoli* var. *typhi*)

RB — rice blast (*Piricularia oryzae*)

H — barley leaf spot (*Helminthosporium* sp.)

The rating scale used to evaluate the following tests is as follows.

1 — severe disease, no control
2 — moderately severe disease
3 — moderate disease
4 — slight disease
5 — no disease Example 20

| Compound | PM | LB | A | BR | RB | H |
|---|---|---|---|---|---|---|
| α-Cyclohexyl-α-(α,α,α-trifluoro-m-tolyl)-5-pyrimidinemethanol | 4 | 1 | 1 | 1 | 1 | 1 |
| α-(4-Chlorophenyl)-α-isopropyl-5-pyrimidinemethanol | 5 | | 4 | 5 | | |
| α-Cyclopentyl-α-(4-methoxyphenyl)-5-pyrimidinemethanol | 5 | 1 | 1 | 1 | 1 | 4 |
| α-(4-Ethoxyphenyl)-α-isopropyl-5-pyrimidinemethanol | 5 | | | 5 | | |
| α-Isopropyl-α-(4-methylsulfonylphenyl)-5-pyrimidinemethanol | 3— | 1 | 2 | 1 | 3 | 1 |
| 5-(α-Cyclohexylbenzyl)pyrimidine | 5 | 2 | 1 | 1 | 2 | 4 |
| α-(2-Chlorophenyl)-α-(3-fluorophenyl)-5-pyrimidinemethanol | 5 | 1 | 4+ | 5 | 1 | 2 |
| α-(3-Chlorophenyl)-α-(4-fluorophenyl)-5-pyrimidinemethanol | 5 | 3— | 4+ | 5 | 1 | 2 |
| α-Isobutyl-α-(4-methoxycyclohexyl)-5-pyrimidinemethanol | 5 | 1 | 2 | 5 | 1 | 1 |
| α,α-Diethyl-5-pyrimidinemethanol | 1 | 3 | 2 | 1 | 1 | |
| α,α-Di(n-pentyl)-5-pyrimidinemethanol | 5 | | | | | |
| 5-Diphenylmethylpyrimidine | 5 | 1 | 4— | 3— | 4— | |
| α-(2-Chlorophenyl)-α-(3-chlorophenyl)-5-pyrimidinemethanol | 5 | 1 | 5 | 4 | 5 | |
| α-(4-Fluorophenyl)-α-phenyl-5-pyrimidinemethanol | 5 | 1 | 5 | 4+ | 3 | |
| α-Cyclohexyl-α-(o-tolyl)-5-pyrimidinemethanol | 5 | 1 | 4 | 4 | 4 | 4 |
| α-Cyclohexyl-α-(2-fluorophenyl)-5-pyrimidinemethanol | 5 | 1 | 3 | 5 | 1 | 4 |
| α-Cyclohexyl-α-(2-ethoxyphenyl)-5-pyrimidinemethanol | 5 | 1 | 3 | 5 | 3 | 4— |

Example 20—Continued

| Compound | PM | LB | A | BR | RB | H |
|---|---|---|---|---|---|---|
| α-Cyclohexyl-α-(4-propoxyphenyl)-5-pyrimidinemethanol | 3 | 1 | 4 | 2 | 3 | 4+ |
| α-Cyclobutyl-α-(4-propoxyphenyl)-5-pyrimidinemethanol | 4 | 1 | 3+ | 3 | 1 | 4 |
| α-(4-Fluorophenyl)-α-(3-methoxyphenyl)-5-pyrimidinemethanol | 5 | 1 | 5 | 4 | 1 | 1 |
| α-(t-Butyl)-α-(4-propoxyphenyl)-5-pyrimidinemethanol | 5 | 1 | 4 | 1 | 1 | 4 |
| α-Cyclohexyl-α-(2,4-dichlorophenyl)-5-pyrimidinemethanol | 4 | 1 | 3 | 5 | 4– | 4 |
| α-(2-Ethoxyphenyl)-α-isopropyl-5-pyrimidinemethanol | 4+ | 1 | 3 | 4+ | 4 | 4+ |
| α-Cyclohexyl-α-pentafluorophenyl-5-pyrimidinemethanol | 5 | 1 | 4 | 1 | 1 | 4+ |

We claim:
1. A compound of the formula

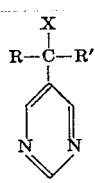

wherein
X is
  hydrogen,
  hydroxy,
  $C_1$–$C_4$ alkanoyloxy,
  $N(R'')_2$,
  $C_1$–$C_3$ alkyl,
  $C_1$–$C_3$ alkoxy,
  $C_1$–$C_3$ alkylthio,
  halo,
  cyano,
  anilino,
  hydroxylamino,
  imidazolylthio,
  furylthio, or
  thienylthio;
R is
  $C_2$–$C_{13}$ alkyl,
  $C_2$–$C_{12}$ alkenyl,

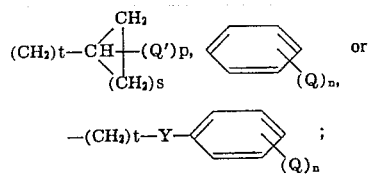

R' is
  $C_2$–$C_{13}$ alkyl,
  $C_2$–$C_{12}$ alkenyl,
  norbornen-2-yl,
  2-norbornyl,
  adamantyl,

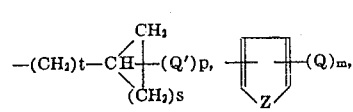

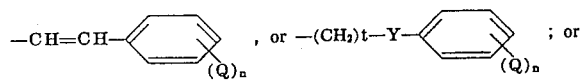

when X is hydrogen or hydroxy, R and R' taken together with the carbon atom to which they are attached form a ring of the formula

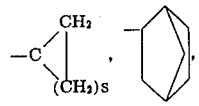

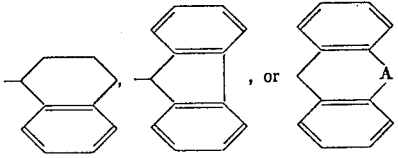

Q is $C_1$–$C_4$ alkyl, $C_1$–$C_4$ alkoxy, $C_1$–$C_4$ alkylthio, halo, hydroxy, trifluoromethyl, $C_1$–$C_4$ alkylsulfonyl, nitro, or di($C_1$–$C_4$ alkyl)amino, or two Q's attached to adjacent carbon atoms of a benzene ring form a methylenedioxy group;
Q' is $C_1$–$C_4$ alkyl or methoxy;
Y is oxygen, sulfur, or a carbon to carbon bond;
Z is oxygen or sulfur;
A is oxygen, sulfur, $CH_2$, $CH_2$—$CH_2$, or $CH=CH$;
R'' is hydrogen, $C_1$–$C_4$ alkyl, or $C_1$–$C_4$ alkanoyl;
n is 0 to 5;
m is 0 to 2;
p is 0 to 3;
s is 1 to 6; and
t is 0 to 5,
and the nonphytotoxic acid addition salts thereof.
2. The compound of claim 1 which is 5-diphenylmethylpyrimidine.
3. The compound of claim 1 which is 5-(α-isopropyl-4-methoxybenzyl)pyrimidine.
4. A compound of claim 1 wherein X is hydroxy, R is $C_2$–$C_{13}$ alkyl, and R' is
  $C_2$–$C_{13}$ alkyl,
  $C_3$–$C_8$ cycloalkyl, or
  phenyl, optionally substituted with
    halo,
    trifluoromethyl,
    $C_1$–$C_4$ alkyl, or
    $C_1$–$C_4$ alkoxy.

5. The compound of claim 4 which is α-isopropyl-α-(4-propoxyphenyl)-5-pyrimidinemethanol.

6. The compound of claim 4 which is α-(t-butyl)-α-(p-tolyl)-5-pyrimidinemethanol.

7. The compound of claim 4 which is α-isopropyl-α-(4-methoxyphenyl)-5-pyrimidinemethanol.

8. The compound of claim 4 which is α-($-ethoxyphenyl)-α-isopropyl-5-pyrimidinemethanol.

9. The compound of claim 4 which is α-(4-chlorophenyl)-α-isopropyl-5-pyrimidinemethanol.

10. The compound of claim 4 which is α-(t-butyl)-α-(4-methoxyphenyl)-5-pyrimidinemethanol.

11. The compound of claim 4 which is α-(p-cumenyl)-α-isopropyl-5-pyrimidinemetahnol.

12. The compound of claim 4 which is α-(3,4-dichlorophenyl)-α-isopropyl15-pyrimidinemethanol.

13. The compound of claim 4 which is α-(3-chlorophenyl)-α-isopropyl-5-pyrimidinemethanol.

14. The compound of claim 4 which is α-cyclohexyl-α-isopropyl-5-pyrimidinemethanol.

15. The compound of claim 4 which is α,α-bis(n-nonyl-5-pyrimidinemethanol.

16. The compound of claim 4 which is α-(α,α,α-trifluoro-m-tolyl)-α-isopropyl-5-pyrimidinemethanol.

17. The compound of claim 4 which is α-(α,α,α-trifluoro-p-tolyl)-α-isopropyl-5-pyrimidinemethanol.

18. A compound of claim 1 wherein X is hydroxy, R is $C_3$–$C_8$ cycloalkyl, and R' is
$C_3$–$C_8$ cycloalkyl, or
phenyl, optionally substituted with
$C_1$–$C_4$ alkyl,
$C_1$–$C_4$ alkoxy, or
halo.

19. The compound of claim 18 which is α-cyclopropyl-α-(p-tolyl)-5-pyrimidinemethanol.

20. The compound of claim 18 which is α-(4-bromophenyl)-α-cyclopropyl-5-pyrimidinemethanol.

21. The compound of claim 18 which is α-cyclopropyl-α-(4-fluorophenyl)-5-pyrimidinemethanol.

22. The compound of claim 18 which is α-cyclobutyl-α-(4-methoxyphenyl)-5-pyrimidinemethanol.

23. The compound of claim 18 which is α-(4-chlorophenyl)-α-cyclopropyl-5-pyrimidinemethanol.

24. The compound of claim 18 which is α-cyclopropyl-α-(4-methoxyphenyl-5-pyrimidinemethanol.

25. The compound of claim 18 which is α-cyclohexyl-α-cyclopropyl-5-pyrimidinemethanol.

26. The compound of claim 18 which is α-cyclopropyl-α-(p-cumenyl)-5-pyrimidinemethanol.

27. The compound of claim 18 which is α-(2-chlorophenyl)-α-cyclohexyl-5-pyrimidinemethanol.

28. The compound of claim 18 which is α-cyclohexyl-α-(2-methoxyphenyl)-5-pyrimidinemethanol.

29. The compound of claim 18 which is α-cyclohexyl-α-phenyl-5-pyrimidinemethanol.

30. The compound of claim 18 which is α-cyclohexyl-α-(2-fluorophenyl)-5-pyrimidinemethanol.

31. The compound of claim 18 which is α-cyclohexyl-α-pentafluorophenyl-5-pyrimddinemethanol.

32. A compound of claim 1 wherein X is hydroxy, R is phenyl, optionally substituted with halo, and R' is phenyl, optionally substituted with
halo, or
$C_1$–$C_4$ alkoxy.

33. The compound of claim 32 which is α-(2-fluorophenyl)-α-(4-fluorophenyl)-5-pyrimidinemethanol.

34. The compound of claim 32 which is α-(2-chlorophenyl)-α-(3-chlorophenyl-5-pyrimidinemethanol.

35. The compound of claim 32 which is α,α-bis(2-chlorophenyl)-5-pyrimidinemethanol.

36. The compound of claim 32 which is α-(4-chlorophenyl)-α-phenyl-5-pyrimidinemethanol hydrochloride.

37. The compound of claim 32 which is α-(4-fluorophenyl)-α-phenyl-5-pyrimidinemethanol.

38. The compound of claim 32 which is α-(2-fluorophenyl)-α-phenyl-5-pyrimidinemethanol.

39. The compound of claim 32 which is α-(2-chlorophenyl)-α-(4-fluorophenyl)-5-pyrimidinemethanol.

40. The compound of claim 32 which is α-(2-fluorophenyl)-α-(3-fluorophenyl)-5-pyrimidinemethanol.

41. The compound of claim 32 which is α-(4-methoxyphenyl)-α-phenyl-5-pyrimidinemethanol.

42. The compound of claim 32 which is α-(2,5-dichlorophenyl)-α-phenyl-5-pyrimidinemethanol.

43. The compound of claim 32 which is α-(2,4-difluorophenyl)-α-phenyl-5-pyrimidinemethanol.

44. The compound of claim 32 which is α-(2,4-dichloro-phenyl)-α-phenyl-5-pyrimidinemethanol.

45. The compound of claim 32 which is α-(2-chlorophenyl)-α-(4-methoxyphenyl)-5-pyrimidinemethanol.

46. The compound of claim 32 which is α,α-diphenyl-5-pyrimidinemethanol.

* * * * *